United States Patent

[11] 3,583,261

[72] Inventor Abigah Benjiman Sheppard, Jr.
 Fresno, Calif.
[21] Appl. No. 752,850
[22] Filed Aug. 15, 1968
[45] Patented June 8, 1971
[73] Assignee American Sugar Company
 New York, N.Y.

[54] TOOL INDEXING DEVICE
 8 Claims, 5 Drawing Figs.
[52] U.S. Cl................................................ 76/82,
 51/102, 51/216, 90/21
[51] Int. Cl................................................. B21k 5/12
[50] Field of Search........................................ 76/82, 85;
 51/216 ND, 216 H, 102; 90/21

[56] References Cited
UNITED STATES PATENTS
| 834,390 | 10/1906 | Maguin | 76/85 |
| 2,069,140 | 1/1937 | Freas et al. | 76/82 |

Primary Examiner—Bernard Stickney
Attorney—Flehr, Hohbach, Test, Albritton and Herbert ABSTRACT: A tool indexing device particularly useful with plural or multibladed tools such as beet knives, where the tool is advanced longitudinally with respect to a contact position simultaneously with lateral movements of the tool to successively bring each blade to the contact position. The tool indexing device is in the form of an indexing block having intersecting work faces each provided with a series of parallel, generally V-shaped grooves. The indexing blocks can be either left-hand or right-hand, with the grooves in one of the work faces intersecting the grooves in the other to effect the desired sequential tool movement.

INVENTOR.
Abigah B. Sheppard, Jr.

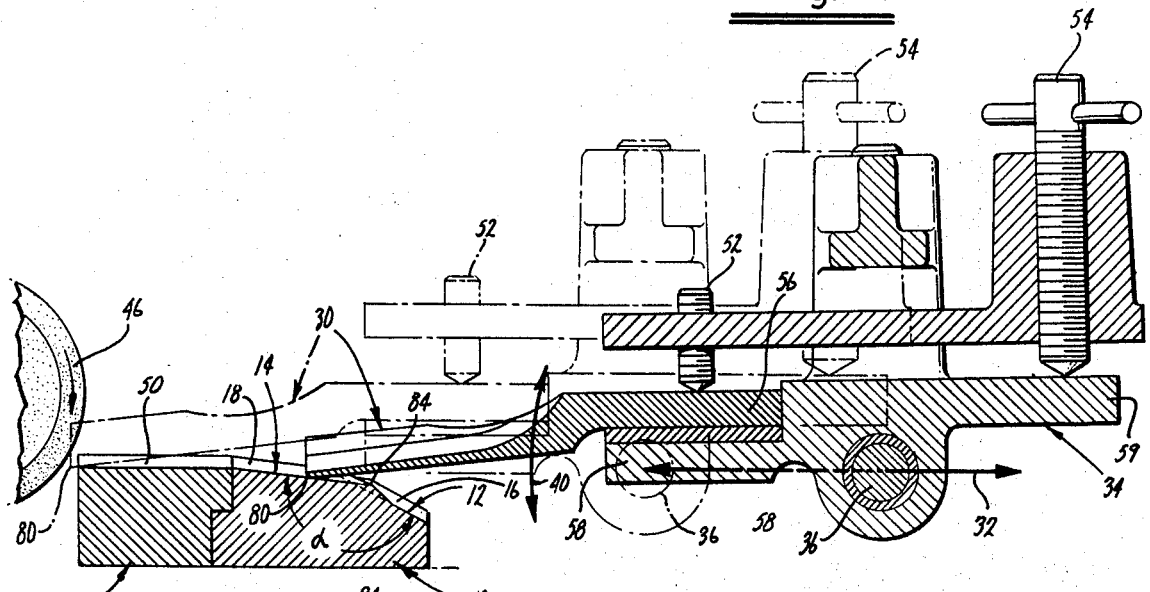
Fig. 2
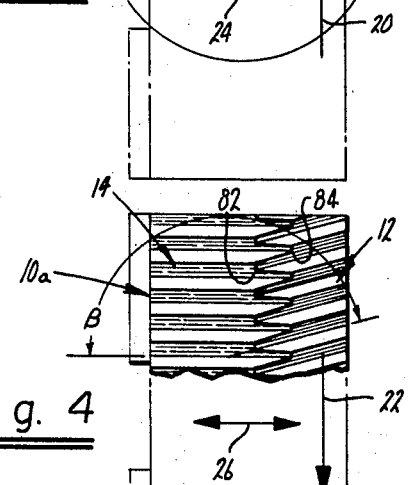
Fig. 3
Fig. 4
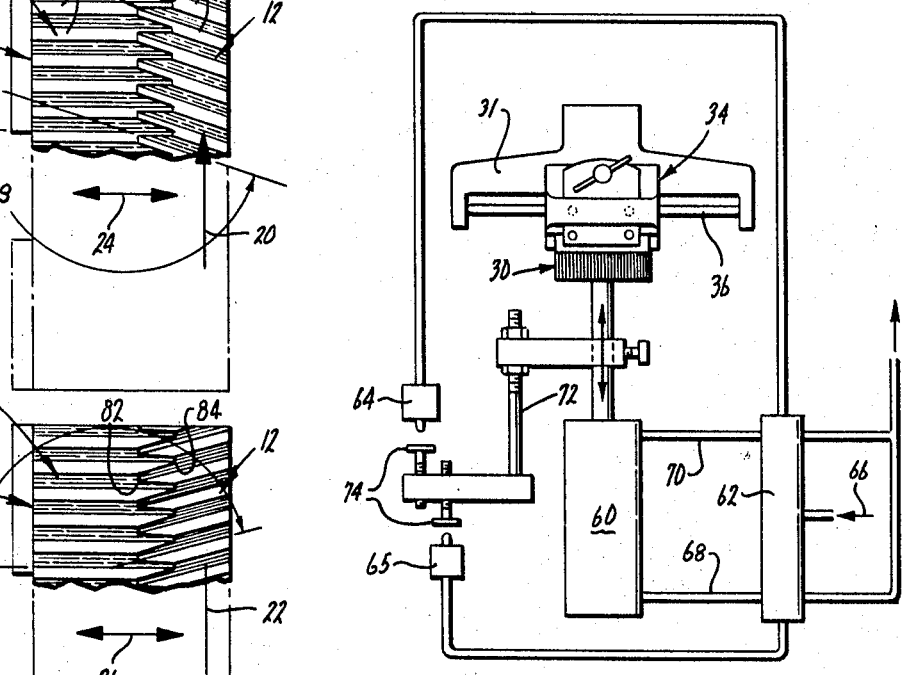
Fig. 5
INVENTOR.
Abigah B. Sheppard, Jr.
BY
Attorneys 3,583,261

1

TOOL INDEXING DEVICE

SUMMARY OF THE INVENTION AND OBJECTS

This invention relates generally to tool indexing devices, and more specifically to such devices as used in operations to successively work a plurality of cutting blades for example, as in the beet knife sharpening machine disclosed in U.S. Pat. No. 2,069,140.

In general, it is an object of the invention to improve upon the construction of such devices, particularly with respect to means by which a multibladed tool (or a plurality of bladed tools) can be quickly and easily moved between successive contact positions to sharpen or otherwise work the multiple blades of the tool.

It is another object of the invention to provide a tool indexing device of the type described employing a single operating member to effect the tool indexing function.

A further object of the invention is to provide a tool indexing device of such character that is readily incorporated into existing machines, and which is easily and inexpensively manufactured.

Another object of the invention is to provide a tool indexing device which is simple in construction, rugged and durable in operation, and which can be easily and inexpensively manufactured to different sizes and configurations as may be necessary to particular tool indexing functions.

Additional objects and features of the invention will appear from the following detailed description of the same, and from the drawings.

BRIEF DESCRIPTION OF THE DRAWINGS

FIG. 2 is a view in the vertical section along the line 2–2 of FIG. 1.

FIG. 3 is a top plan view of the tool indexing device shown in FIG. 1.

FIG. 4 is a like view of a tool indexing device of opposite hand.

FIG. 5 is a schematic view illustrating a pneumatic system for advancing and retracting a tool with respect to the tool indexing device of the invention.

DETAILED DESCRIPTION OF PREFERRED EMBODIMENT

Figure 1:
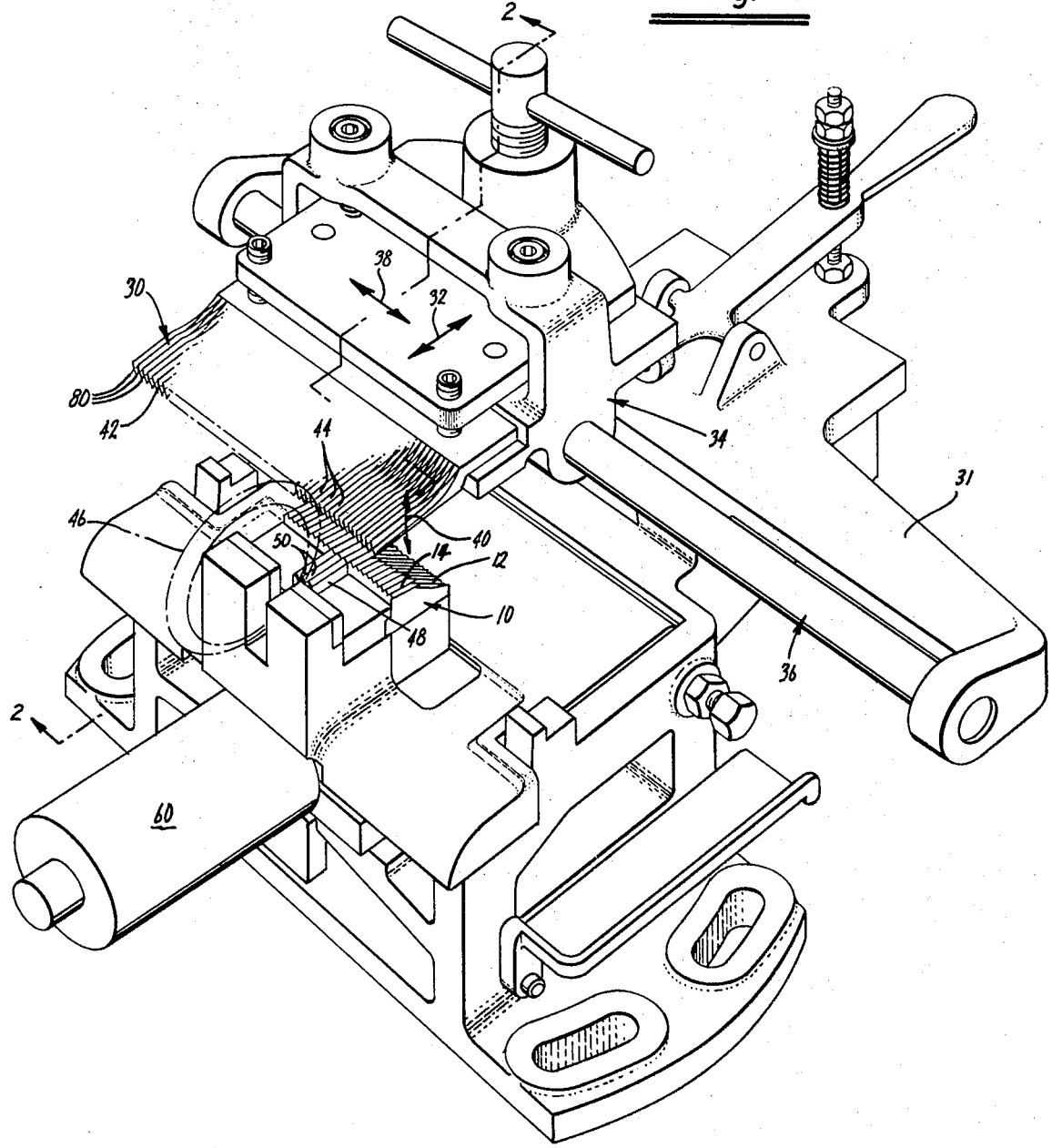
FIG. 1 is a view in perspective of a tool indexing device embodying the invention, shown in conjunction with a multibladed tool and associated means for advancing and retracting the tool with respect to a work station.

In the drawings, the tool indexing device has been illustrated as primarily of metallic construction. It is to be understood, however, that any suitable material such as sintered metal, stone or metal composition, or like material may be employed in particular embodiments.

Generally stated, the tool indexing device of the present invention comprises a one-piece tool support and guide member having intersecting substantially planar work faces on its upper surface. Each of the work faces is provided with a series of closely adjacent more or less parallel guideways formed, for example, as V-shaped grooves. The guideways of one of the work faces intersects the guideways of the other at an angle to thereby effect sideways or traversing movements of a tool being advanced and retracted on the upper surface of the indexing device with respect to a work station. The device thus functions to move the tool laterally with each to and fro movement of the tool into a contact or work position within the station.

Referring to the drawings in detail, 10 indicates a right-hand tool device block provided with rear end forward substantially planar work faces 12 and 14 respectively, which together form the operative surface of the device. As illustrated, each of the work faces is formed with a series of closely adjacent V-shaped grooves or guideways respectively designated 16 and 18. In the case of a tool indexing block to be used in a beet knife sharpening operation, the V-shaped grooves 16 and 18 have a cross-sectional configuration closely approximating that of the lower surface of the beet knife (FIG. 1).

As represented in FIGS. 3 and 4, the tool indexing blocks 10 may be either right-hand or left-hand. Thus the tool indexing block of FIG. 3 will function to move a tool to the right, as represented by the arrow 20. In like fashion the tool indexing block 10A, shown in FIG. 4, will function to move a tool to the left as represented by the arrow 22. It will be understood that this sideways or traversing movement occurs upon to and fro reciprocating movements of a tool or workpiece on the upper surface of the tool indexing block, such reciprocating movements being represented by the arrows 24 and 26, respectively, in FIGS. 3 and 4.

As best illustrated in FIG. 2, the separate work faces 12 and 14 of the indexing block intersect one another to form an obtuse angle on the upper surface of the block, indicated by the angle $\alpha$. The V-shaped grooves of the separate work faces 16 and 18 likewise intersect one another to form an obtuse angle, as represented by the angle $\beta$ in FIGS. 3 and 4. As will hereinafter be explained, use of obtuse, relatively shallow angles of intersection between the work faces 12 and 14, and between the grooves 16 and 18 thereon, effects a relatively smooth indexing operation as the tool or workpiece is advanced or retracted on the surface of the indexing block 10.

For purposes of illustration, the tool indexing block 10 is shown in conjunction with a beet knife sharpening machine making use of a reciprocating slide carriage, for example as generally described and illustrated in the U.S. Pat. No. 2,069,140. Thus as particularly shown in FIGS. 1 and 2, the knife 30 is mounted for to and fro reciprocating movements on the slide carriage 31 (arrow 32) by means of the tool carrier 34. The tool carrier, in turn, is mounted for the traverse sliding movements with respect to the carriage by means of a horizontal support rod 36 (arrow 38), such mounting also permitting pivotal movements of the beet knife with respect to the support rod (arrow 40). The illustrated beet knife 30 is of conventional form having a lower serrated face 42 which is generally matched by the transverse cross section of the grooved faces 12 and 14 of the tool indexing block 10. The upstanding blades 44 of the beet knife are adapted to be engaged for sharpening by the rotary grinding wheel or cutter 46. Alignment of the blades 44 during this sharpening operation can be accomplished by a separate cooperating guide block 48, likewise provided with a plurality of grooves 50 similarly corresponding in angularity and spacing to the serrations on the underside 42 of the beet knife 30. As will be understood, the block 48 provides only a guiding and alignment function, therefore its transverse dimensions are substantially less than the dimensions of the tool indexing block 10. In practice the guide block 48 may be eliminated as its function is not essential to the successful practice of the present invention.

In general, the grooves 16 and 18 are provided on the upper surface of the indexing block 10 in sufficient number to insure a positive contact between the underside 42 of the beet knife and the work faces 12 an 14 of the indexing block. This positive contact is necessary to insure parallelism between the knife blades 44 and sharpening wheel 46, throughout the operations to advance, retract and index the beet knife 30. In general, 10 to 20 grooves have been found to be sufficient for this purpose.

Referring to FIG. 2, the beet knife is held within the carrier 34 by any suitable mechanism, for example clamp means 52 adapted to hold a rear extension 56 of the beet knife against an extending wing 58 of the tool carrier 34. Suitable tensioning means 54 similarly cooperating with a rear extension 59 of the tool carrier may also be provided. It will be understood that the entire support structure for the carrier 34, generally represented by the slide carriage 31 and slide rod 36, is adapted to reciprocating movements (to and fro along the arrow 32) by means of an actuating air cylinder 60, schematically illustrated in FIG. 5. The air cylinder 60 responds in conventional fashion to actuation of a 3-way valve 62 and cooperating bleed valves or poppets 64 and 65. Thus as shown in FIG. 5, a supply of air under pressure (arrow 66) is diverted by the valve 62 through the lines 68 and 70 to advance and retract the slide carriage 31 together with the tool carrier 34. Forward or advancing movements of the carriage 31 are controlled by the poppet or bleeder valve 64, whereas rearward or retracting movements are controlled by a reversing poppet or bleeder valve 65. Adjustment of the stroke is obtained by the adjustable mounting 72 for the poppet actuaters 74, which likewise can be adjustably mounted. As will be understood, a supply of high-pressure air to the 3-way valve 62 will effect constant "in" and "out" movements of the tool carrier 34 and its support structure, in response to actuation of the air cylinder 60 by the poppet or bleeder valves 64 and 65.

OPERATION

The overall operation of the tool indexing mechanism of the invention can be briefly described as follows:

Assuming a reciprocating motion of the tool carrier 34 (in response to actuation of the air cylinder 60, as above described), the workpiece 30 is sequentially advanced into contact with the rotary cutter 46, and retracted, as generally indicated by the arrow 32. As the workpiece is advanced by the carrier 34, contact points 80 on its lower serrated face 42 move within the grooves 16 of the rear face 12 of the tool indexing block 10. This movement is accompanied by a slight upward pivoting and sideways sliding of the workpiece and carrier 34 with respect to the slide rod 36. As the workpiece is advanced past a point of intersection of a groove 18 by a groove 16 (designated at 82 in FIGS. 3 and 4), it is again slid sideways as the forward end of the workpiece falls or pivots into the grooves of the forward face 14. The direction of movement of the workpiece is now changed by the grooves 18, as well as the grooves 50 of the guide block 48, to one of general parallelism with the rotating member 46. At the end of the stroke, one side of an upstanding knife blade 44 is brought into contact with the operative edge of the rotary grinding wheel, to effect filing or sharpening. In the case of the tool indexing block 10 shown in FIG. 3, contact is made with the right-hand sides of the knife blades 44, as viewed from the top rear in FIG. 1. In the case of the tool indexing block 10A shown in FIG. 4, grinding contact is with the left-hand sides of the blades 44.

On retracting the workpiece (on a reverse stroke of the actuating cylinder 60), the grooves 50 and 18 achieve a reverse parallel movement of the workpiece. However, movement of the workpiece to the point of intersection of the grooves 18 with the grooves 16 causes the contact points 80 of the workpiece to again fall or pivot downward and thereby effect a further sideways movement of the workpiece and its carrier on the slide bar 36.

The above-described shifting or sliding of the workpiece as it moves between the grooves 16 and 18 is a function primarily of the slight angle between the grooves which causes each set of grooves to break through the upstanding walls dividing the other set of grooves. This feature of the indexing block 10 is particularly represented at the points 82 and 84 in FIGS. 3 and 4. The sliding or traversing movements of the workpiece are further facilitated by the slight obtuse angle α between the work faces 12 and 14. Thus, as particularly illustrated in FIG. 2, downward pivoting of the workpiece will necessarily occur at the point of intersection 84 between the grooves 16 and 18. A similar downward pivoting also occurs at the points 82. The repeated to and fro movements of the carrier to advance and retract the workpiece consequently effects a continuing lateral shifting of the contact points 80, each time these contact points pass a point of intersection 82 or 84 on the surface of the indexing block.

In a complete knife sharpening or filing operation, the carrier 34 is positioned on the slide rod at one side so that the same sides (right or left) of the blades 44 are advanced in sequence into contact with the cutter 46. Thereafter the indexing block is replaced with the block of opposite hand, and the operation repeated to sharpen the opposite sides of the blades 44. In the illustrated operation, the indexing block 10 would serve to sharpen the right-hand sides of the blades 44, whereas the block 10A would serve to sharpen the left-hand sides of the blades 44. It should be pointed out that while two indexing block positions are required to sharpen both sides of the blades 44, the direction of entry of the knife is unimportant, the grooves 16 serving only to cooperate with the construction and/or orientation of a particular machine. Therefore a single machine may be operated with either a left-hand or a right indexing block, as illustrated in FIGS. 3 and 4.

To those skilled in this art many additional changes in construction and widely differing applications of the invention will suggest themselves without departing from the spirit and scope of the invention. For example, while the present description is particularly related to the sharpening of a multibladed type of cossette knives for use in the sugar beet industry, the described tool indexing devices could be used with equal effectiveness in the sharpening of a plurality of individual knives held in a holder, or in the sharpening, grinding, or other working of multibladed tools of various types for varied applications. Accordingly, it should be understood that the disclosure as well as the description herein is purely illustrative and is not intended to be in any sense limiting.

I claim:

1. A tool indexing device adapted to cooperate with a tool carrier mounted for operations to advance and retract a tool with respect to a work station simultaneously with operations to traverse the tool with respect to said work station, said indexing device comprising a tool support and guide member provided with intersecting substantially planar work faces, said work faces each being provided with a series of closely adjacent tool advancing guideways arranged in substantially parallel relation with respect to one another, the guideways of one of said work faces intersecting the guideways of the other of said work faces at an angle to thereby effect traversing movements of the tool.

2. A tool indexing device as in claim 1 in which said tool advancing guideways are in the form of substantially V-shaped grooves cut into the planes of said work faces.

3. A tool indexing device as in claim 1 in which the planes of said work faces intersect one another to form an obtuse angle on the upper surface of said indexing device.

4. A tool indexing device as in claim 1 in which the guideways of said work faces intersect each other at an obtuse angle to facilitate traversing movements of the tool in response to said advancing and retracting movements.

5. A tool indexing device as in claim 1 in which the guideways are cut in the form of substantially right angle V-shaped grooves adapted to cooperate with the serrated lower face of a multibladed beet knife.

6. In a machine for sharpening serrated beet knives, wherein the beet knife is mounted for traversing as well as advancing and retracting movements with respect to a rotary cutter, a beet knife indexing device, said indexing device comprising a knife support and guide member provided with intersecting substantially planar work faces, said work faces each being provided with a series of closely adjacent knife contacting guideways in substantial parallelism and having a cross-sectional configuration corresponding to that of the lower face of the beet knife, the guideways of one of said work faces intersecting the guideways of the other said work faces at a relatively shallow obtuse angle, whereby to and fro reciprocating movements of the beet knife to effect sharpening of the same simultaneously effect traversing movements of the knife to sequentially sharpen successive adjacent blades of the beet knife.

7. A machine as in claim 6 wherein said knife indexing device has the guideways of one of its work faces arranged at an angle to the other face so as to effect sharpening of the right-hand edges of the knife blades.

8. A machine as in claim 6 wherein said knife indexing device has the guideways of one of its work faces arranged at an angle to the other face so as to effect sharpening of the left-hand edges of the knife blades.